United States Patent
Handerek

(10) Patent No.: US 10,281,300 B2
(45) Date of Patent: May 7, 2019

(54) DISTRIBUTED OPTICAL FIBRE SENSOR

(71) Applicant: Fotech Solutions Limited, London (GB)

(72) Inventor: Vincent Handerek, Essex (GB)

(73) Assignee: Fotech Solutions Limited, London (GB)

( * ) Notice: Subject to any disclaimer, the term of this patent is extended or adjusted under 35 U.S.C. 154(b) by 0 days.

(21) Appl. No.: 15/566,541

(22) PCT Filed: Apr. 26, 2016

(86) PCT No.: PCT/GB2016/051169
§ 371 (c)(1),
(2) Date: Oct. 13, 2017

(87) PCT Pub. No.: WO2016/174410
PCT Pub. Date: Nov. 3, 2016

(65) Prior Publication Data
US 2018/0094952 A1    Apr. 5, 2018

(30) Foreign Application Priority Data
Apr. 27, 2015    (GB) .................. 1507114.5

(51) Int. Cl.
*G01D 5/353* (2006.01)
*G01H 9/00* (2006.01)
*G01M 11/00* (2006.01)

(52) U.S. Cl.
CPC ......... *G01D 5/35361* (2013.01); *G01H 9/004* (2013.01); *G01M 11/3118* (2013.01)

(58) Field of Classification Search
CPC .............. G01D 5/35361; G01H 9/004; G01M 11/3118
See application file for complete search history.

(56) References Cited

U.S. PATENT DOCUMENTS

2009/0214204 A1* 8/2009 Bengtsson ......... H04B 10/0793
                                                                  398/38
2014/0022530 A1    1/2014 Farhadiroushan et al.

FOREIGN PATENT DOCUMENTS

| CN | 102435296 A | 5/2012 |
| GB | 2442745 A | 4/2008 |
| WO | WO 01/31288 A1 | 5/2001 |
| WO | WO 2008/056143 A1 | 5/2008 |
| WO | WO 2011/148128 A1 | 12/2011 |
| WO | WO 2012/063066 A2 | 5/2012 |

(Continued)

OTHER PUBLICATIONS

Grattan et al., "Distributed fiber optic sensors," *Optical Fiber Sensor Technology*, vol. 1, Ch. 11, Chapman and Hall, London, 1995, section 11.3.1, pp. 350-351 and section 11.4.1, pp. 364-365.

(Continued)

*Primary Examiner* — Hina F Ayub
(74) *Attorney, Agent, or Firm* — Leydig, Voit & Mayer, Ltd.

(57) ABSTRACT

The disclosure relates to distributed optical fiber sensors arranged to detect coherent Rayleigh backscatter from a sensing optical fiber disposed in an environment, and to determine an infrasonic signal in the backscatter, or to determine a change in the environment within an infrasonic frequency range from the backscatter.

49 Claims, 6 Drawing Sheets

(56) References Cited

FOREIGN PATENT DOCUMENTS

| WO | WO 2012/076873 A2 | 6/2012 |
|----|-------------------|--------|
| WO | WO 2012/117223 A1 | 9/2012 |
| WO | WO 2014/201313 A1 | 12/2014 |
| WO | WO 2015/076976 A1 | 5/2015 |

OTHER PUBLICATIONS

Minto, "Achieving zero pipeline leak incidents using DAS techniques," *Oil & Gas News*, Oct. 28-Nov. 3, 2013, p. 37.
"Pipeline Integrity Management: Leak Detection," OptaSense, downloaded from the Internet at http://www.optasense.com on Mar. 2, 2016, 5 pp.
Rathod et al., "Distributed temperature-change sensor based on Rayleigh backscattering in an optical fiber," *Optics Letters*, 19(8), pp. 593-595, Apr. 15, 1994.
Worsley, "Maintaining integrity", *European Oil and Gas*, 104, Jan. 3, 2014, 4 pp., downloaded from the Internet at http://www.europeanoilandgas.co.uk/article-page.php?contentid=19044&issueid=535.
European Patent Office, International Search Report in International Patent Application No. PCT/GB2016/051169, dated Jul. 1, 2016, 3 pp.
European Patent Office, Written Opinion in International Patent Application No. PCT/GB2016/051169, dated Jul. 1, 2016, 6 pp.
United Kingdom Intellectual Property Office, Search Report in United Kingdom Patent Application No. GB1507114.5, dated May 17, 2015, 2 pp.

\* cited by examiner

DISTRIBUTED OPTICAL FIBRE SENSOR

CROSS-REFERENCE TO RELATED APPLICATIONS

This patent application is a national phase of PCT Application PCT/GB2016/051169 filed Apr. 26, 2016, and claiming priority to British Patent Application GB 1507114.5 filed Apr. 27, 2015.

FIELD OF THE INVENTION

The present invention relates to distributed optical fibre sensors, in which one or more physical parameters are sensed as a function of position along a sensing optical fibre from the properties of probe light backscattered within the sensing fibre. In particular, but not exclusively, the invention relates to optical time domain reflectometry (OTDR) sensors for use in detecting changes in the environment of a sensing optical fibre, and such sensors which use phase sensitive OTDR techniques such as through the detection of coherent Rayleigh backscatter interference, or other interferometric techniques.

BACKGROUND OF THE INVENTION

Distributed optical fibre sensing is a well known approach to providing information about environmental conditions surrounding a sensing optical fibre. Fully-distributed sensing in principle provides spatially resolved information from every point along the fibre. Variables that can be sensed include temperature, static strain, pressure, and vibration.

One such technique detects variations in refractive index, induced by a physical forcing such as vibration, in the coherent Rayleigh backscatter interference profile of light backscattered within a sensing optical fibre interrogated by an optical source of limited bandwidth. Such Rayleigh backscatter interference profiles arise from interference between the many components of the backscattered light originating from different points along a portion of the sensing optical fibre illuminated by the optical source. Such techniques are described, for example, in WO2008/056143.

It would be desirable to address problems and limitations of the related prior art.

SUMMARY OF THE INVENTION

Accordingly, the invention employs a distributed optical fibre sensor, for example a distributed optical fibre vibration sensor, and processing of infrasonic signals, in order to recognise events in an environment of the sensor that do not necessarily have distinctive, or indeed any, acoustic signature in the audible frequency range. For example, it is noted that infrasonic signals can be produced by slow changes in temperature and/or strain of the sensing fibre of a distributed acoustic sensor, as discussed in more detail below.

Although distributed vibration sensors have been used in the past to detect vibrations in the audible range, the invention proposes to examine infrasonic regions of the vibration spectrum in order to assist in detection of slow changes in the environment of a sensor which can indicate events of interest to a user, such as for example, leaks in conduits or storage facilities, or slow deformation of structures. Such events may not produce unambiguous audible acoustic signatures, but the infrasonic detection capability of the present invention can provide additional information to help identify such events.

Accordingly, the invention provides a distributed optical fibre sensor. The sensor may be arranged to detect changes in the environment of a sensing optical fibre, the sensor being arranged to detect an infrasonic signal in a coherent Rayleigh backscatter interference signal, and to detect changes in the environment of the sensing optical fibre from the infrasonic signal. The sensor may also or instead be arranged to determine, a coherent Rayleigh backscatter interference signal, changes in the environment of the sensing optical fibre, wherein the determined changes in the environment are within an infrasonic frequency range.

To this end, the sensor may also comprise a probe light source arranged to generate probe light pulses; and an optical detector arranged to receive probe light backscattered within the sensing optical fibre and to detect a coherent Rayleigh backscatter interference signal within the backscattered probe light.

The sensor may also comprise an analyser arranged to carry out the described analysis of the detected coherent Rayleigh backscatter interference signal to detect said changes in the environment of the sensor. The analyser may be implemented in hardware, in software, or in a combination of the two, and may typically comprise one or more microprocessors with associated memory to provide data and program storage to carry out the data analysis functions described herein, and with suitable output facilities to provide results for example to a video screen, over a network connection, to a data store, to trigger one or more visible and/or audible alarms, and so forth.

The optical detector may be arranged to detect the coherent Rayleigh backscatter interference signal as a function of both time and of position along the sensing optical fibre. This enables the analyser to detect both temporal and spatial characteristics of the interference signal so as to better infer an event in the environment of the sensing optical fibre, for example according to one ore more event models available to or stored by the analyser.

In particular, changes in the environment of the sensing fibre give rise to changes in one or more of temperature and strain, and therefore refractive index, of the sensing optical fibre, and thereby give rise to the detected changes in the coherent Rayleigh backscatter interference signal as a function of both time and position along the sensing optical fibre.

An event model may capture various aspects of events to be inferred from the interference signal, typically based on an inferred location of the event. For example, requiring a characteristic of the matched coherent Rayleigh backscatter interference signal followed over time to reach a peak value wherein the peak value reached diminishes in magnitude with increasing distance from the inferred event, and/or requiring a timing of a peak in a characteristic of the matched coherent Rayleigh backscatter interference signal to become more delayed with increasing distance from the inferred event, and/or requiring characteristics of spatial symmetry about a position of the inferred event to be present. The characteristic of the matched coherent Rayleigh backscatter interference signal may typically comprise at least one of: rate of change of optical phase, that is phase slew rate, whether over multiple fringes or a smaller range; and frequency arising from multiple fringes over a period of time. However, other characteristics such as fringe visibility and fringe intensity may also or instead be used.

The analyser may also be arranged to detect an expansion geometry of an event, such as a leak, from a power law behaviour of a feature of the matched coherent Rayleigh backscatter interference signal, such as a moving spatial peak in one or more of the above characteristics, for example the power law behaviour of such a peak in terms of one or more of velocity, position, and magnitude of the peak.

The analyser may be arranged to track the optical phase of the matched coherent Rayleigh backscatter interference signal, and the event model may then require the phase of the matched coherent Rayleigh backscatter interference signal to change monotonically in the vicinity of the inferred event, at least over a particular extended time period in order to match a particular event model.

In order to carry out matching an event model to aspects of the detected coherent Rayleigh backscatter interference signal, the sensor may comprise a number of functional elements including one or more of: an analogue to digital converter to digitize the signal; a differentiator to carry out a differentiation of the signal with respect to time; an infrasonic frequency filter to select for infrasonic parts of the signal; a phase tracker to track a phase of at least a part of the signal; a peak height filter to indicate the likelihood of a particular signal component representing a monotonic rather than rapidly oscillating change in refractive index; a moving disturbance detector; and an acoustic signal detector.

The matched coherent Rayleigh interference signal may be required to be in an infrasonic frequency range.

However, the analyser may also be arranged to detect an acoustic signal in the detected coherent Rayleigh backscatter interference signal, at frequencies above infrasonic frequencies, and an event model may comprise an expected acoustic signal of the event, the analyser being arranged to match the detected acoustic signal to the expected acoustic signal in making the comparison, for example an acoustic signal of a fluid escaping from a structure in the vicinity of the sensing optical fibre. Indeed, the analyser may be arranged to refine the location of the supposed event using the position along the sensing optical fibre of a peak in the expected acoustic signal. The analyser may also be arranged to detect from the infrasonic and/or audible acoustic signal from a disturbance in the environment of the sensing optical fibre which is moving along the sensing optical fibre, and to selectively reject an inferred or detected event if it is coincident with such a disturbance.

The invention may be used to detect a variety of different events in the environment of a sensing optical fibre. Such events include a leak of fluid from a structure proximal to the sensing optical fibre, for example where the fluid before leaking is at higher or lower temperature than the environment about the sensing optical fibre, so as to cause a change in temperature of the fibre due to the leak.

The invention also provides methods corresponding to the described apparatus, such as a method of detecting changes in the environment of a sensing optical fibre, comprising: delivering probe light pulses into a sensing optical fibre disposed within the environment; detecting a coherent Rayleigh backscatter interference signal from probe light backscattered within the sensing optical fibre; and at least one of: (a) detecting an infrasonic signal in the coherent Rayleigh backscatter interference signal and inferring changes in the environment of the sensing optical fibre from the infrasonic signal, and (b) determining, from the coherent Rayleigh backscatter interference signal, changes in the environment of the sensing optical fibre, wherein the determined changes in the environment are within an infrasonic frequency range.

The invention also provides computer program code arranged to put into effect one or more of the described analysis functions of the analyser, and one or more computer readable media carrying such computer program code.

The invention also provides the described analyser independently of the other aspects of the sensor required to generate the coherent Rayleigh backscatter interference signals, such as the light source, sensing optical fibre, detector optics, and so forth.

BRIEF SUMMARY OF THE DRAWINGS

Embodiments of the invention will now be described, by way of example only, with reference to the accompanying drawings, of which.

DETAILED DESCRIPTION OF EMBODIMENTS

Figure 1:
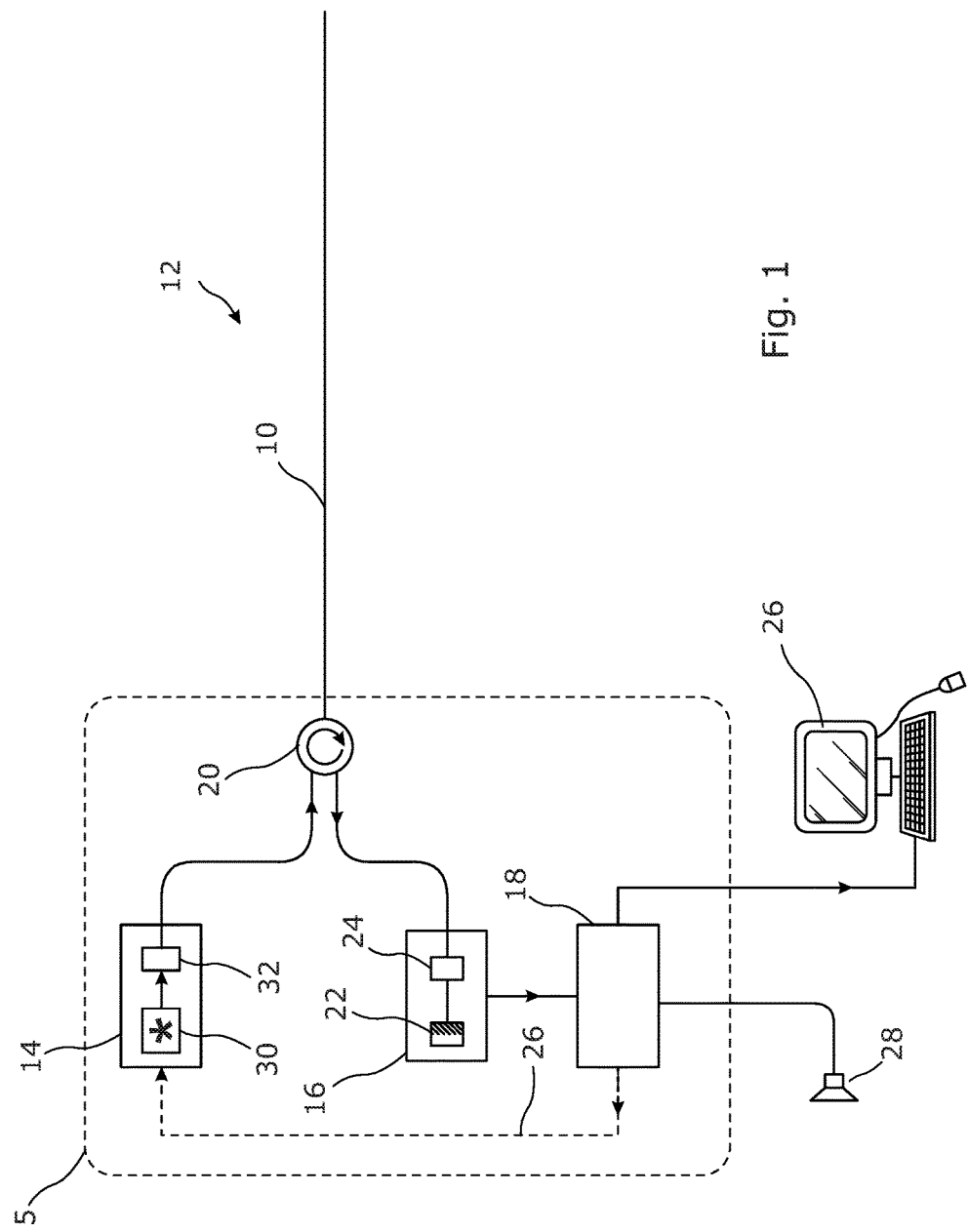
FIG. 1 illustrates a distributed optical fibre sensor for detecting changes and events in an environment of a sensing optical fibre.

Referring to FIG. 1 there is illustrated a distributed optical fibre sensor arranged to sense one or more physical parameters as a function of position along part or all of a sensing optical fibre 10 using time domain reflectometry, or another reflectometry technique. An interrogator unit 5 of the sensor includes a probe light source 14 for generating probe light pulses of suitable timings, shapes and wavelengths, an optical detector 16 for detecting probe light resulting from the probe light pulses being backscattered within the sensing fibre 10, and an analyser 18 for processing data, such as properties of the backscattered and detected light, which has been received at the detector.

The probe light source 14 forms probe light pulses, each pulse having an optical wavelength. The probe light pulses are forwarded to a circulator 20 and from there on to the sensing optical fibre 10 which passes through an environment 12 of the sensing optical fibre.

Probe light which has been Rayleigh backscattered within the sensing optical fibre 10 is received at the circulator 20 which passes the collected light on to the detector 16, which comprises a detector element 22. The detector element may comprise, for example, one or more suitable photodiodes. The backscattered light is conditioned in the detector using one or more detector optical conditioning components 24. The detector 16 then passes a detected backscatter signal corresponding to the detected backscattered probe light to the analyser 18.

The analyser 18 generates and outputs analysis results such as a determination of the one or more physical parameters, or a determination of changes or detection of an event in the environment 12 of the sensing optical fibre 10, on the basis of the signal received from the detector 16. In FIG. 1 this output is passed to a computer display 26, although various other types of output mechanism may be used, for example one or more visible or audible alarms 28 which are operated when certain conditions are met in respect of the detected environment of the sensing optical fibre 10, such as detection of a relevant event in the environment. The analyser 18 may also use data derived from the detected backscatter to provide control signals 26 to the probe light source 14. A variety of control signals may be provided, including signals controlling the durations, timings and wavelengths of probe light pulses, as required. In alternative embodiments, the control functions may be implemented separately to the analyser 18, for example in a separate controller element (not shown in the figure).

The probe light source contains one or more laser sources 30 to generate the probe light pulses. The probe light pulses are conditioned in the probe light source by one or more source optical conditioning components 32.

The sensor can be used to interrogate multiple sensing optical fibres in parallel, and/or in two directions around a loop of sensing fibre, using probe light pulses of different wavelengths, as described in WO2012/076873, which is hereby incorporated by reference for all purposes. Various other arrangements and configurations of the sensor may be employed as will be familiar to the person skilled in the art.

The sensor may be operated using phase-sensitive optical time domain reflectometry (PS-OTDR) in which probe light pulses are used which are each sufficiently coherent that the detected backscatter signal contains or is dominated by self-interference between different parts of the same pulse. Such techniques are discussed in WO2008/056143 which is hereby incorporated by reference for all purposes. The resulting coherent Rayleigh backscatter leads to a temporal speckle pattern of interference fringes at the detector, which may be referred to as a coherent Rayleigh backscatter interference signal. This signal from the detector then represents, for each probe light pulse, a time series of intensity of the detected coherent Rayleigh backscatter interference. In order to sense changes over time at a particular position along the sensing optical fibre, the temporal development of the interference signal, for a particular round trip time delay for travel of a probe light pulse which corresponds to that position, is followed over a series of probe light pulses. The round trip time to the end and back to the detector for a 1000 meter long sensing fibre is about 10 microseconds, so that a pulse repeat rate of up to about 100 kHz can easily be used if required, although much lower pulse rates may be used, depending on the upper bounds of the frequency range of a disturbance signal to be detected.

The sensor may particularly be used to detect disturbances to the sensing optical fibre 10 in one or both of the audible acoustic and infrasonic frequency bands. Such disturbances may be detected through the changes they induce in the temperature and/or strain of the fibre, which in turn affect the refractive index of the fibre in the locality of the disturbance. These changes in refractive index give rise, in turn, to changes in the interference fringes which make up the coherent Rayleigh backscatter interference signal. An acoustic signal can be derived from such a temporal development quite simply by differencing successive interference signal samples for a particular sensing fibre position, or in other more complex ways. Some techniques which may be used for detecting disturbances to the sensing optical fibre at acoustic and other frequencies are set out in WO2012/063066, which is hereby incorporated by reference for all purposes. This WO '066 document also explains techniques which may be used to increase the dynamic range and sensitivity of the detection process using probe light pulses of different wavelengths, and such techniques may be used in embodiments of the present invention.

Figure 2:
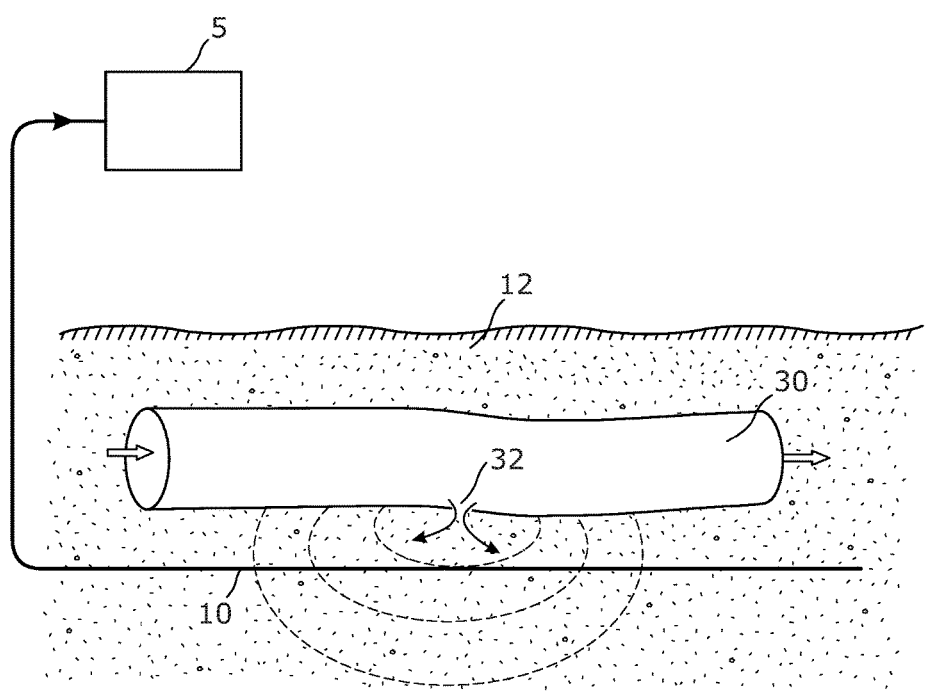
FIG. 2 illustrates the sensor of claim 1 detecting an event, which in this case is a leak of fluid from a pipeline giving rise to a progressive temperature change along the sensing optical fibre.

FIG. 2 illustrates how the sensor of FIG. 1 may be used to detect changes in an environment of the sensing optical fibre 10. In the example of FIG. 2 the sensing optical fibre 10 is disposed proximally to a structure 30. In FIG. 2 the structure 30 happens to be a pipe or a pipeline which carries a flowing fluid and which is buried in the ground, and the sensing optical fibre is either buried close to, or is coupled to or mounted on the pipeline. However, the sensing optical fibre could be disposed in a wide range of other situations such as: proximal to, coupled to, outside, at, or within: a pipeline which is buried or above the ground; a structure of a different kind such as a fence, wall, roadway, railway, building, bridge, well bore, electrical cable, pipe, and so forth, each of which may be buried, partly located in the ground, or above the ground as appropriate for the structure.

In the example of FIG. 2 a leak 32 has occurred in the pipeline, and a fluid carried in the pipeline is escaping into the adjacent underground environment 12. In the likely case that the fluid at the time of escape is of a different temperature to the ground around the pipeline (either higher or lower), this gives rise to a progressive temperature change in the environment 12 as the leaking fluid travels away from the leak point. This progressive temperature change constitutes a change in the environment of the pipeline and of the sensing optical fibre which gives rise to changes in refractive index of the fibre which are detected using the analyser from changes in the coherent Rayleigh backscatter interference pattern. Eventually it may be expected that the temperature changes in the ground around the pipeline reach a steady state, depending on the development of the leak and the continuation, temperature and pressure of the flow in the pipeline. This could take between a few seconds and a few hours depending on the nature of the pipeline, the fluid, the environment and the temperatures involved.

The change in temperature illustrated in respect of FIG. 2 is just one example of a slow change in the environment of a sensing optical fibre which may be detected from changes in the detected coherent Rayleigh backscatter interference signal using the present invention. Other examples could be from heat released due to arcing, short circuiting, or other power dissipation increases in an electrical cable; a rise in a level of ground water or in an open water feature such as a pool or river; subsidence in a road or other built structure; deformation of a pipeline, bridge or other structure and so forth. Other examples include slow earth movements, earthquakes, subterranean pressure changes and physical state changes.

In each type of change to be detected, changes in the environment falling within the infrasonic frequency range are detected from the coherent Rayleigh backscatter interference signal. Infrasonic frequencies may typically be defined as frequencies below 20 Hz, although a different threshold near this value such as 30 Hz or 10 Hz could instead be used. As discussed below, depending on the optical detection and analysis methods used, coherent Rayleigh backscatter interference signals reflecting these infrasonic changes in the environment may also or instead be within the infrasonic frequency range, although in some detection techniques a higher frequency signal may be interpreted as an indication of an infrasonic frequency change in the environment.

In the prior art, distributed optical fibre sensors detecting coherent Rayleigh noise are frequently used for detecting acoustic vibrations. However, in this prior art, frequencies in the infrasonic range are considered not to be useful, constituting noise, random, and systematic variations which are undesirable, and are therefore filtered out in the detection and analysis procedure. The present inventors have realised that infrasonic signals in the coherent Rayleigh backscatter interference signal may be useful for a variety of applications, and can be exploited in a variety of ways as described in more detail below. Similarly, the detected coherent Rayleigh backscatter interference signal may contain signals of changes in the environment which are occurring at infrasonic frequencies, even if some or all of the relevant frequencies in the signal are above the infrasonic range.

Embodiments of the invention may therefore employ a distributed optical fibre sensor with processing of infrasonic signals either found in the coherent Rayleigh backscatter interference signal, in the detected changes in the environment, or in both, in order to help to identify events that may not have distinctive acoustic signatures at audible frequencies above the infrasonic range. Infrasonic signals can be produced by slow changes in fibre temperature or strain, as illustrated in FIG. 2 and explained in more detail below.

An ideal two-path interferometer can be used to explain the principle of operation of the sensor. A relative phase, $\Delta\phi_b$, of light emerging from an undisturbed, two-path interferometer illuminated by a sufficiently coherent source of wavelength λ is given by:

$$\Delta\phi_b = 2\pi n_e d/\lambda$$

where $n_e$ is the effective refractive index of the propagation medium (i.e. sensing optical fibre 10) and d is a physical distance of the path imbalance in the interferometer. When the interferometer is undisturbed, this phase is commonly referred to as the 'bias phase delay' of the interferometer. Small disturbances of the interferometer will lead to corresponding disturbances of the path imbalance around this bias value. The output optical intensity of an ideal interferometer with perfectly coherent illumination is proportional to one plus the cosine of the instantaneous phase imbalance. In the context of the invention described here, the location and mean path imbalance of the interferometer are set by parameters of the optical reflectometry system. In the case of optical time domain reflectometry, the location of an interferometer element is defined by the time delay after launching an optical interrogation pulse into the sensing optical fibre 10, and the mean path imbalance is related to the physical length of the portion of the fibre that is illuminated at any instant in time, in other words a physical length of a single probe light pulse. However, the actual bias phase delay for each sensing position along the fibre will typically be very large compared to $2\pi$ radians, and the exact value of the phase bias within a range of $2\pi$ will be unpredictable, since the fibre properties and state of background strain are both prone to vary with position.

It is important to note that the path imbalance in the interferometer can be changed by straining the fibre locally or by changing its temperature. For typical silica based fibres operating in standard wavelength bands, changes in path length vary linearly with strain at a rate of approximately $10^7$ radians/meter per unit strain and with temperature at a rate of approximately $10^2$ radians/K/meter. Thus for a sensor using optical pulses equivalent to 1 meter of spatial extent, 1 radian of phase variation will be produced by a strain change of the order of $0.05 \times 10^{-6}$ or by a temperature change of $5 \times 10^{-3}$ K. These figures account for the double passage of the light through the sensing region of the sensing optical fibre.

For detection of infrasonic signals in the changing environment, it is important to understand the lower limit to the frequency range that can be sensed using the described coherent Rayleigh backscatter interference sensor. This limit is set by the stability of the interrogation system, particularly in terms of the wavelength and power of the interrogation pulses. In addition, the stability of the environment of the sensing fibre is relevant. When fibre is buried in a subterranean or submarine environment, temperature and static strain variations are minimised and useful signal bands can extend well below 1 Hz, and sometimes to below $1 \times 10^{-3}$ Hz or less, especially if suitable stability measures are taken with respect to the probe light source 14 and other optics.

Considering a gradual monotonic change in temperature or strain of the sensing optical fibre at a particular position over a number of seconds or minutes, the coherent Rayleigh backscatter interference detected in correspondence to that position will cycle through a number of interference fringes (peaks and troughs in intensity) at a phase slew rate which is dependent on the rate of change of temperature or strain. For example, a rate of temperature change of 1 degree Kelvin over 4 minutes, at 5 mK per radian, will correspond to a phase slew rate of about 0.83 radians per second, which will be detected as a frequency in the signal of about 0.13 Hz. A faster temperature change of 1 degree in 10 seconds would be detected as a frequency of about 3 Hz. Similar calculations can easily be done in respect of changes of strain. For example, a strain rate of 0.1με/s will produce a signal frequency of about 0.16 Hz.

Assume that the scenario of FIG. 2 gives rise to temperature rises in the environment of the sensing optical fibre which are of the order of 1 degree in a few seconds to a few minutes. The total temperature changes, and rates of temperature change, are then expected to be smaller in magnitude and delayed at further distances from the position of the leak because of the time taken for the leaking fluid and associated heat to disperse, and the increasing distance from the heat source. This gives rise to characteristic features at infrasonic frequencies in the coherent Rayleigh backscatter interference signal as illustrated in FIG. 3.

Figure 3:
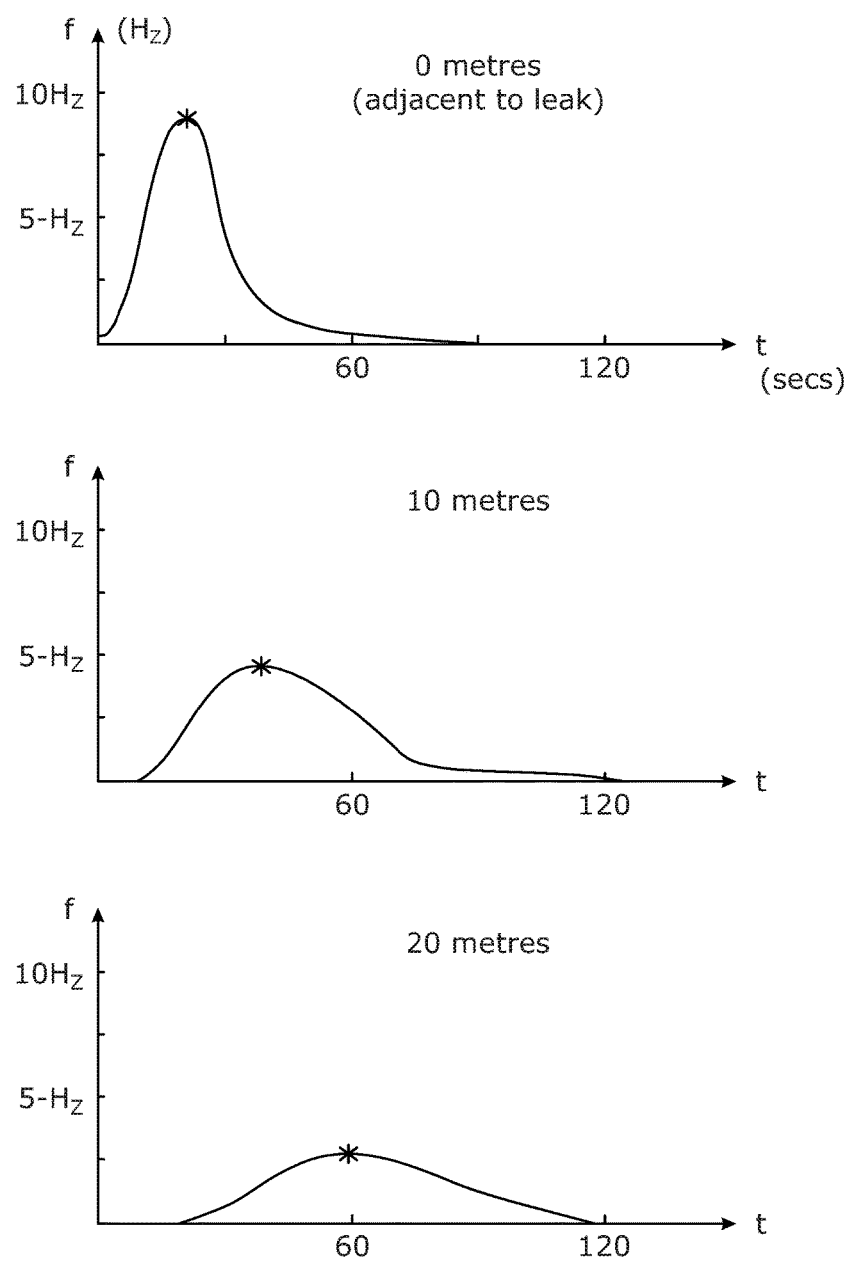
FIGS. 3 and 4 show how refractive index changes in the sensing optical fibre of FIGS. 1 and 2 give rise to infrasonic frequency signals in the coherent Rayleigh backscatter interference detected by the sensor.

Three graphs are shown in FIG. 3. Each is presented with frequency of a coherent Rayleigh backscatter interference signal in the ordinate, and time from the start of the leak in the abscissa. As discussed above, this frequency is proportional to the rate of temperature change (and/or change in strain) which gives rise to refractive index change in the sensing optical fibre. In the top graph, the signal from a position in the sensing optical fibre which is adjacent to the leak is shown. The frequency rises rapidly almost as soon as the leak starts and the temperature at that position either rises or falls quickly over about 30 seconds before stabilizing at the new temperature by about 60 seconds after the leak. At a distance of 10 meters from the leak, in the middle plot, the onset of the temperature change is delayed by about 10 seconds due to the delay in the leaking fluid reaching this location, and the peak rate of change of temperature and therefore signal frequency is also smaller and later. The lower graph, at a further distance of 20 meters from the leak shows further delay and a lower peak rate of temperature change than in the middle graph.

The three curves of FIG. 3 may be characterised in various ways, and analysed in order to detect a particular event such as the leak of FIG. 2. For each of the curves of FIG. 3 a peak in frequency of the detected signal has been marked by an asterisk. This peak represents the maximum phase slew rate and therefore the peak rate of change of refractive index in the optical fibre induced by the event. One characteristic of these peaks is that they diminish in frequency and become more delayed in time at further distances from the leak or other event. As described in more detail below, the analyser may implement an event model to identify such characteristics, and depending on the data available to the model, conclude that a particular event has occurred. Based on the data, the model may also identify particular parameters of the event, such as a location of the leak itself (which could be determined from a central point in a spatially symmetric pattern), an estimated egress rate of fluid at the leak (which could be determined from the peak frequency adjacent to the leak which represents the fastest refractive index change, a geometry of the leak for example determining that the leaking fluid is expanding in essentially one, two or three dimensions or in some mixture of these, and so forth.

A leak expanding essentially in one dimension, for example purely along a linear pipeline may be referred to as a linear expansion of the leaking fluid. A leak expanding essentially in two dimensions, for example in a plane such as through a planar joint between structure layers, or a layer of a porous material, may be referred to a planar expansion of the leaking fluid. A leak expanding in essentially three dimensions, for example into a homogenous volume of porous soil, sand or other surrounding material may be referred to as volumetric expansion of the leaking fluid. Of course, in practical scenarios, the geometry of the expansion is likely to be a more complex mixture of these three aspects, and the behaviour of the expansion of the front of the leaking material into the surrounding environment will therefore exhibit a mixture of these behaviours which may be further complicated in apparent behaviour by changes in the discharge rate of a fluid at the leak over time, and other factors.

Figure 4:
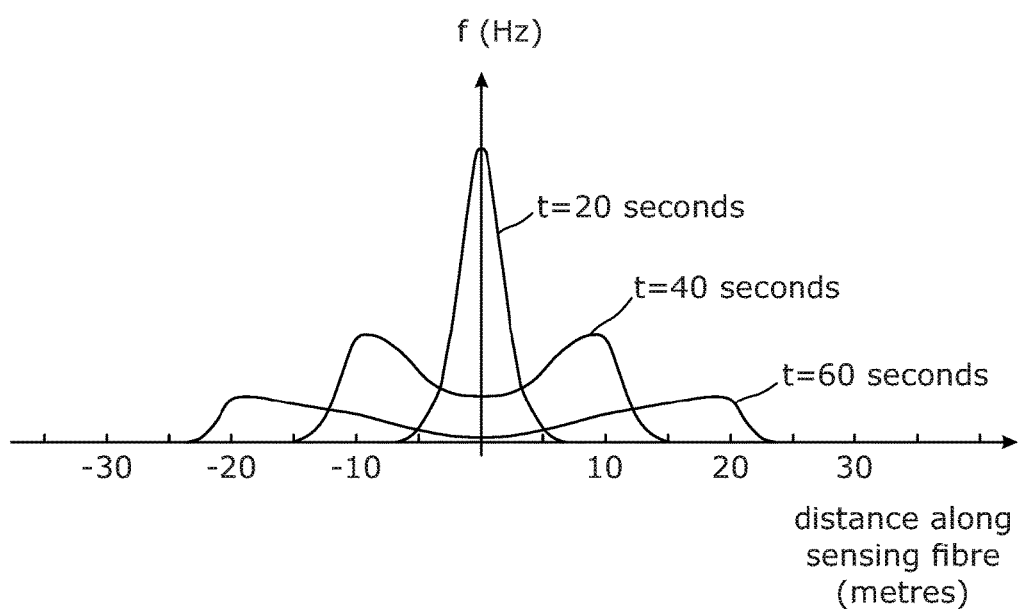

FIG. 4 illustrates how the leak event of FIG. 3 may be viewed as a spatially propagating characteristic, and in particular taking a form which is essentially symmetrical about the leak event, or other environment event to be detected. In this graph, the ordinate represents a detected frequency of the coherent Rayleigh backscatter interference signal, or perhaps some other suitable characteristic or combination of such characteristics, and the abscissa represents distance in meters along the sensing optical fibre 10, with the zero distance point in the graph being arbitrarily chosen to correspond to the location of a particular event such as a leak.

The curves of FIG. 4 are labelled according to a supposed elapsed time following a start time of the event, such as a start time of a leak. At time t=20 seconds, the detected frequencies have a peak close to the event location where heating or cooling due to the leak is still strongest, but as time progresses this peak splits into two, and the two peaks propagate away from the leak in both directions along the sensing fibre, corresponding to propagation of the points at which the rate of change of temperature and therefore the phase slew rate is highest.

About 40 seconds after the event, the peaks in phase slew rate are about 10 meters from the leak, but the peak frequency is now only about half that seen at t=20 seconds due to the lower rate of heating at this distance from the leak. By 60 seconds after the event, these peaks have progressed further to about 20 meters from the leak, and have diminished further in peak frequency.

The speed of propagation of the characteristic peaks away from the central event location may be close to constant for some distance from the event, indicating that the majority of the leaking fluid is following a path along the sensing fibre (for example corresponding to a path along a pipeline), or the speed may diminish, indicating a wider spread of leaking fluid propagation. Theoretically, leaking symmetrically into a three dimensional volume would give rise to a cube root diminishment in speed with distance, and into a two dimensional plane would give rise to a square root diminishment in speed with distance. However, the propagation is unlikely to follow any such law with any precision, and moreover, is unlikely to be exactly symmetric along the sensing fibre, due to variations in the resistance to flow of the leaked fluid, porosity and available volume in the environment and other factors. Never the less, embodiments of the invention are able to identify and optionally also derive characteristics of an event such as a leak event from characteristics in space and/or time of the coherent Rayleigh backscatter interference signal.

Although FIGS. 3 and 4 show characteristics of the development of peaks in the frequency of the coherent Rayleigh backscatter interference signal, other characteristics of the signal may be used. For example, at a point where the sensing optical fibre is far enough away from the leak, or if the leak gives rise to a sufficiently small change in the environment, the response of the coherent Rayleigh backscatter interference signal may be sufficiently small that the local interference fringes move through less than $2\pi$ radians. In such a case, as well as in other circumstances, the change in the environment may be detected using a non-cyclic change in the interference intensity level at that point. Similarly, an indication of phase slew rate and therefore temperature change or other effect could be obtained using a time differential of the coherent Rayleigh backscatter interference signal at each relevant point. Other characteristics of the coherent Rayleigh backscatter interference signal which may be used include fringe visibility, intensity and so forth.

The above discussion is also relevant to various types of event other than leaks, for example as discussed elsewhere in this document.

Figure 5:
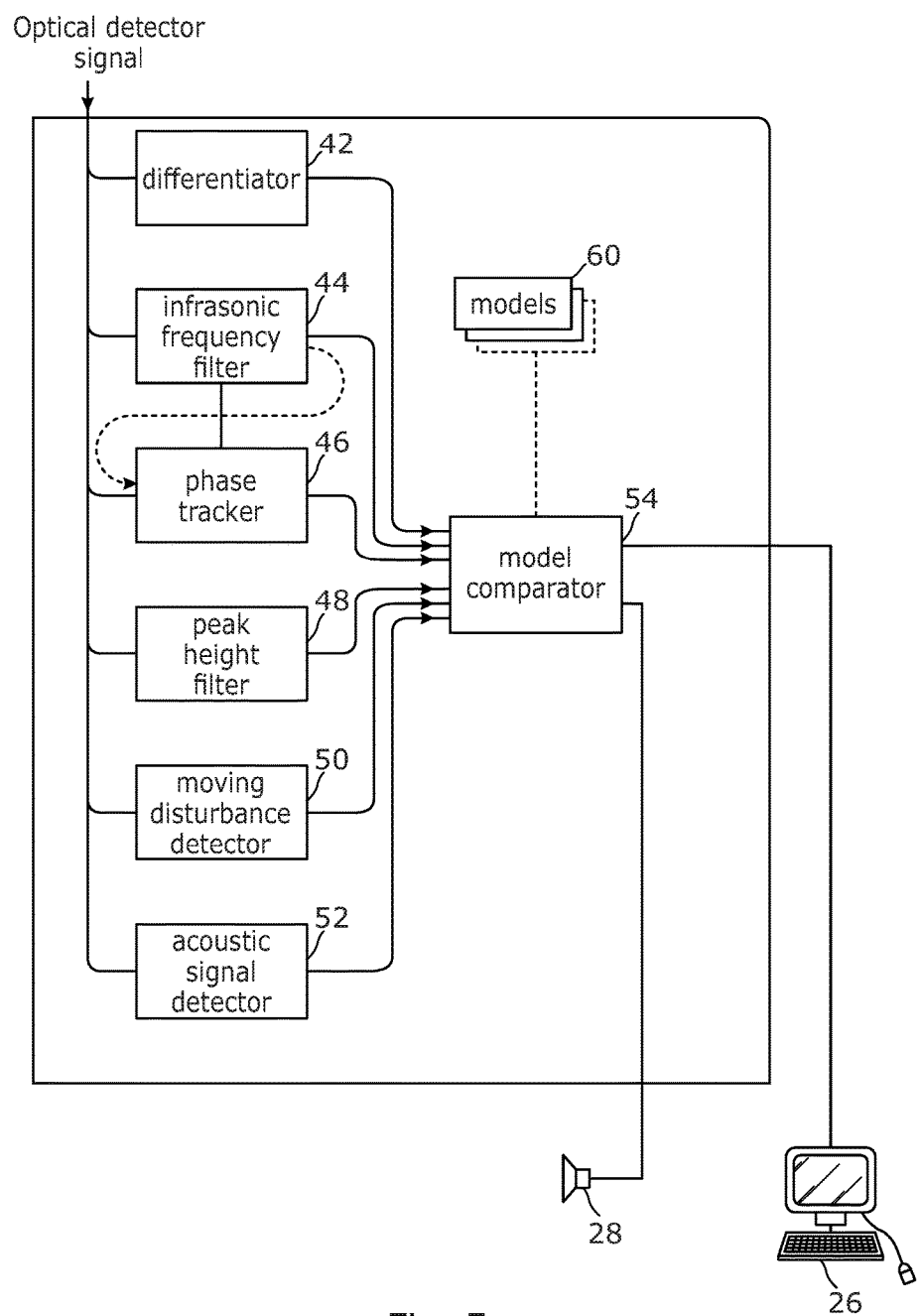
FIG. 5 shows details of the analyser 18 of FIG. 1.

It should be understood that in order to detect signals at the infrasonic frequencies shown in the graphs of FIGS. 3 and 4, suitable spectral analysis and/or filtering of the coherent Rayleigh backscatter interference signal may be required, for example to exclude higher frequency acoustic and other parts of the signal required for this analysis, and/or to selectively filter for signals which are expected to represent the infrasonic changes in the environment which are to be detected. To this end, FIG. 5 illustrates some optional components of the analyser 18. The components of FIG. 5 may be implemented in hardware, in software, or both. For example, the analyser 18 may receive a digitised version of the coherent Rayleigh backscatter interference signal from the optical detector 16 which comprises an analogue to digital converter, and carry out all subsequent analysis steps in software, or analogue to digital conversion may be provided within the analyser.

As illustrated in FIG. 5, the analyser 18 may include a number of different signal processors or signal processing functions that may be used in a complementary manner to analyse the detected interference signal. If the detected signal is produced by direct detection, then the periodic nature of the transfer function between optical phase delay and reflected intensity will present cases that can be classified into three situations, depending on the overall optical phase change $\Delta\phi$ produced by the event, and the phase slew rate $\alpha$ radians per second:

a) Small amplitude ($\Delta\phi<2\pi$)

b) Large amplitude, low phase slew rate ($\Delta\phi>2\pi$ rad and $\alpha<2\pi\times20$ rad s$^{-1}$)

c) Large amplitude, high phase slew rate ($\Delta\phi>2\pi$ rad and $\alpha>2\pi\times20$ rad s$^{-1}$)

(Here the infrasonic/audible boundary is chosen as 20 Hz, giving rise to the regime boundary based on the stated values of $\alpha$, but of course other boundaries could be used).

For cases where there is only a very small total deviation in optical phase, classified as situation (a) above, the resulting signal changes will not be oscillatory. These cases can be detected by differentiating the signal at any particular location with respect to time. The magnitudes and timings of these differentials will then follow similar patterns to those shown in FIGS. 3 and 4, and these patterns can be used to identify the leak condition in the same manner as for the larger phase disturbances. In FIG. 5, the analyser 18 therefore comprises a differentiator 42 arranged to receive the coherent Rayleigh backscatter interference signal and to output a temporally differentiated signal which is indicative of the infrasonic changes in the environment which are to be detected in situation (a).

In FIG. 5, the analyser 18 also comprises an infrasonic frequency filter 44 arranged to receive the coherent Rayleigh backscatter interference signal and to select for and output a filtered signal which is indicative of infrasonic changes in the environment which are to be detected, for example by filtering to retain only frequencies which are infrasonic, or in some other range. This filter 44 is useful for detecting environmental events where resulting signals fall under category (b) above. Filter characteristics which could be used to this effect could include filtering for relatively slowly moving peaks in the infrasonic frequency spectrum which persist for at least several seconds, and/or such peaks where there are two peaks which move in opposite directions as shown in FIG. 4.

Filter functions in the analyser could be implemented using infinite-impulse response (recursive) filters to accomplish the required action in real time, while differentiation can be implemented using temporal finite difference calculations or in other ways.

For situation (c) above, intensity oscillations in the coherent Rayleigh backscatter interference signal intrude into the audible part of the acoustic spectrum. Nevertheless, the temporal and spatial symmetries illustrated in FIGS. 3 and 4 still apply for events such as leak events, and can therefore be used to identify such an event.

For sensing systems that provide a linear output in terms of detected optical phase change versus strain or temperature changes, frequency based separation for example to isolate particular frequency bands or between infrasonic and audible acoustic signals will be more reliable than in systems where the transfer function between these parameters and optical phase is non linear. Linear outputs can be achieved by a variety of optical signal detection methods, including options based on coherent detection, or multi-wavelength interrogation in the case of direct detection. Techniques to achieve this may involve using probe light pulses of different wavelengths, for example as discussed in WO2012/063066, in combination with phase stepping interferometry and a phase unwrapping algorithm.

The coherent Rayleigh backscatter interference signal giving rise to the detected infrasonic frequency profiles shown in FIGS. 3 and 4 can then be represented for example as graphs of rate of change of phase or phase slew rate. In the event that the detected signal at a particular frequency is indeed caused by a monotonic change in refractive index over multiple fringes, then a graph of phase change will look essentially identical to the corresponding graph of frequency in FIG. 3. However, if the detected signal at a particular frequency shows oscillating or unstable phase change then this is indicative of another source of the signal, for example an audible acoustic source. Such phase change data could be used in various ways, for example by taking a running average of the phase change data. Relatively slowly moving peaks in a time differential of a tracked phase, for example where these peaks behave symmetrically or as otherwise discussed above, may therefore indicate a leak or other environmental event.

The analyser 18 of FIG. 5 therefore also comprises a phase tracker 46 which is arranged to receive the coherent Rayleigh backscatter interference signal, either directly from the optical detector, or after some other processing such as by the frequency filter 44, and to determine a phase signal of the coherent Rayleigh backscatter interference signal. This is preferably done in one or more particular selected frequency bands, for example at a frequency in the signal which appears to be due to a monotonic change in refractive index, noting that such a frequency may shift over time and therefore peak tracking may be employed to ensure that the phase of the same signal is being followed. A control signal to effect this could be received from the frequency filter 44. Implementing such a phase tracker may require the probe light source 14 to emit probe light pulses of multiple frequencies, for example under control of the analyser via control signals 26.

Signals within the coherent Rayleigh backscatter interference signal which correspond to monotonic changes in interferometer phase which are persistent over many fringe cycles may also be characterised by a consistently high peak to peak range of the oscillatory signal. The analyser 18 may therefore also comprise a peak height filter 48 arranged to derive a measure of the coherent Rayleigh backscatter interference signal, in one or more particular frequency bands which may track a moving frequency peak, indicating the likelihood of a particular signal component representing a monotonic rather than rapidly oscillating change in refractive index.

Figure 6:
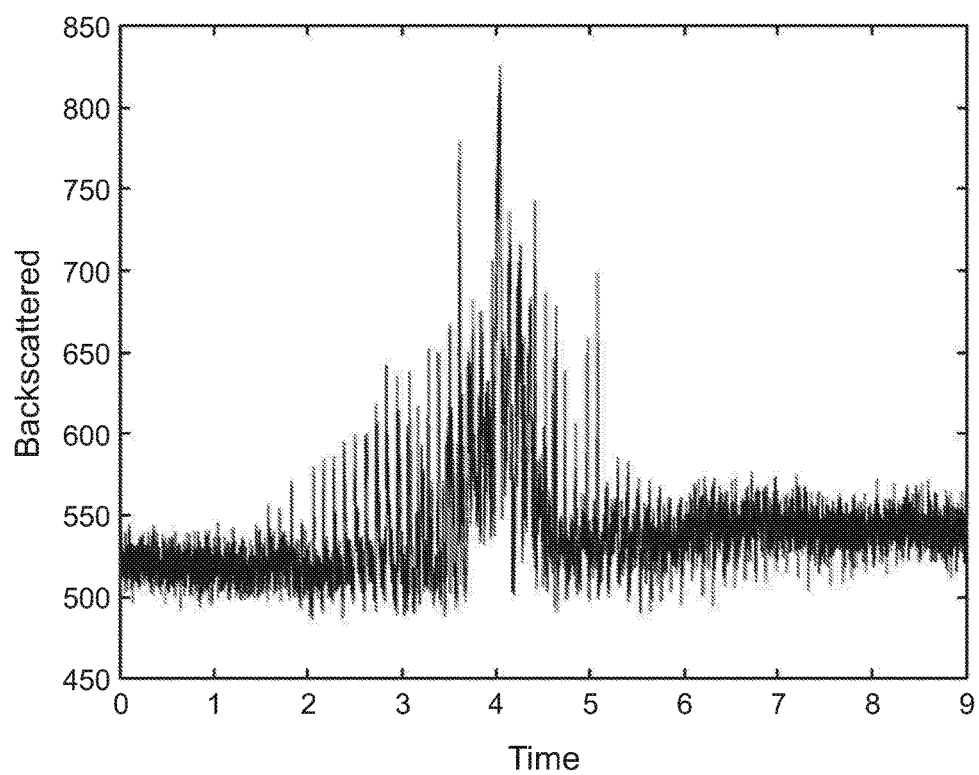
FIG. 6 is a plot of coherent Rayleigh backscatter interference detected by the sensor as a result of a person walking past a buried sensing fibre.

FIG. 5 also shows the analyser 18 as comprising a moving disturbance detector 50. This detector aims to detect passing disturbances to the sensing optical fibre such as a person walking or vehicle driving past or along or across the location of the fibre. FIG. 6, for example, shows the temporal response of backscatter from a buried sensing optical fibre at a single location when a person walks past that point. The spikes in the plot are individual footsteps. Notice that the mean backscattered power changes slowly as the person passes the point in question. This backscatter change represents the response of the fibre to the deflection of the ground produced by the weight of the walker. Strain and temperature changes on similar time scales will produce similar effects, but if slow changes are caused by moving objects, the backscatter from a single location will normally change in a temporally symmetric pattern as the disturbance source passes by and will return to a level similar to the initial value, as shown in FIG. 6. On the other hand, a gradual change in temperature or strain will result in a final backscattered power level that is unlikely to offer a symmetrical pattern in time or to return to its original value. These features can be used by the moving disturbance filter to distinguish between passing disturbance sources and gradual changes at fixed locations. In addition, when many adjacent locations are being monitored simultaneously, moving disturbance sources can be identified and tracked by the moving disturbance detector 50 so that there is further potential for eliminating confusion in identifying an event to be detected.

FIG. 5 also shows the analyser 18 as comprising an acoustic signal detector 52. Some events in the environment of the sensing optical fibre 10 may be expected to produce a characteristic acoustic signature which can be detected in the coherent Rayleigh backscatter interference signal. For example, a leak from a pipeline or within the casing of a well bore may give rise to the sudden onset of a persistent but diminishing acoustic signal of limited bandwidth as the fluid escaping from the pipeline makes a characteristic hiss, whistle or other sound. Such a signature will have a very high travel velocity and so will appear within a very short time interval and at diminishing acoustic power at increasing distances from a central location. The acoustic signature detector 52 is arranged to detect such signatures, which may vary depending on the type of event that is to be detected.

The characteristics expected in the spatial and temporal development of the coherent Rayleigh backscatter interference signal as a result of a particular event, such as a leak from a pipe, may be characterised by one or more models 60, typically stored in the analyser as algorithm code and/or data, and the sensor may carry out analysis of the signal using the one or more models 60 to detect the modelled events, and parameters of those events such as position, magnitude (for example flow rate), speed, and so forth. The analyser 18 depicted in FIG. 5 therefore also comprises a model comparator 54 which accepts signal data from one or more of the other elements the analyser 18 of FIG. 5 including the differentiator 42, the infrasonic frequency filter 44, the phase tracker 46 and the peak height filter 48, and fits this data to the one or more models.

Using the above or other functionality, the analyser 18 may be arranged to detect changes in the environment of the sensing optical fibre in both space and time. For example, a spatially symmetrical profile, as illustrated in FIGS. 2, 3 and 4 by distances in both directions along a structure, may be sought, with physical extent depending on local conditions such as soil structure in the case of buried sensing fibre, and preferably such a spatially symmetrical profile which propagates outwardly from a central point over time, and which preferably also diminishes in magnitude as it so propagates.

A profile or feature such as a propagating peak, which could be diminishing in magnitude away from a supposed event, and/or could be one or a pair of spatially symmetric peaks propagating away from a central supposed event, may also be used to determine an expansion geometry of an event such as a fluid leak from a conduit, for example from a power law behaviour of spatial movement. This power law behaviour may be behaviour of one or more properties such as position or velocity of the peak or other feature of the interference signal along the sensing optical fibre. To use the spatial behaviour of a peak or other feature in this way it may be necessary to assume that the flow rate of fluid escaping through a leak point is approximately constant over an interval to be analysed in this way. It may also be necessary to assume that the sensing optical fibre is oriented approximately in the same direction as the fluid of the expanding leak front.

For example, the physical front of an expanding fluid issuing at an approximately constant rate from a leak point, where the fluid and therefore the front of the leak is expanding homogenously in essentially one dimension, that is linearly (for example along the outside of an existing structure such as a pipeline, or along a conduit associated with the pipeline), will lead to a position of the front varying approximately proportionally (linearly) with time, and to the speed of propagation of the peak being constant with time, with suitable constants such as a zero time offset. If the fluid and therefore the leak front is expanding in essentially two dimensions, for example through a porous layer or planar joint, this will lead to a position of the front varying approximately as a square root of time, or the speed of propagation of the peak varying as one over the square root of time, again with suitable constants. Similarly, if the front of an expanding fluid issuing from a leak point is expanding essentially in three dimensions, then the position of the leak front will vary approximately as a cube root of time, and the speed of the leak front as approximately time to the power of minus two thirds, again with suitable constants.

Because the front of the leaking fluid may be spatially coincident or otherwise associated with a peak in the detected interference signal as discussed above, the exponent of any of the above or other power law behaviours in one or more features such as a peak of the interference signal may be used to infer a geometry of the leak 12. For example, the exponent of power law behaviour of position along the sensing fibre of a peak in the interference signal will typically be within the range from about 1 representing linear expansion, through about ½ representing planar expansion, to about ⅓ representing volumetric expansion, and with exponents with a value of 1 less than these for speed of movement of a peak. The exponent of such power law behaviour may therefore be determined by the described apparatus, and in particular the analyser, to thereby specify, describe or infer a geometry of expansion of the leak.

In practice, complexities and variations in the geometry of expansion of the leaking fluid, variations in the rate of discharge of fluid at the leak point, and other factors including measurement noise and errors, may lead to an exponent representing leak geometry varying from about 1.2 down to about 0.2, from which useful information regarding the geometry of the leak can still be inferred.

The exponent of power law behaviour described above can be calculated by the apparatus in various ways, for example using suitable curve fitting software to determine a fit of different power law curves to data representing spatial movement of a feature of the interference signal.

The temporal patterns that may be sought could include an optical phase gradient that increases from and then returns to zero over a long period of time commensurate with the changes in the environment which are to be expected based on local conditions. These conditions would again include features such as soil structure and in addition the temperature (if known) of the leaking product.

A phase gradient having a uniform sign (positive or negative) throughout the period being examined may also be sought. In contrast a travelling disturbance would tend to lead to periods of both positive and negative going phase change before the signal returns to a steady state. Indications of positive and negative sequential changes can therefore be correlated with outputs from the moving disturbance detector 50 to provide greater confidence in the output of the model comparator 54.

Strong acoustic disturbances can in some circumstances produce long term changes in the optical phase measured at a location along a fibre. This can occur due to gradual or sudden relaxation of mechanical strains within the sensing cable under the action of the external disturbance. Sudden relaxation of strain will manifest as a higher frequency transient signal with different starting and ending values of optical phase. The brief extent of the temporal signature of these sudden relaxations can be used to exclude their interpretation as events to be detected such a leak events. Slower strain relaxation might be interpreted as partial evidence for a leak or other event condition and may in any case accompany a genuine occurrence of a leak or other event, thus the model comparator should not be programmed to ignore this condition, but could use the characteristics of a co-located acoustic signal to determine the presence or absence of a leak or other event. For example, a co-located acoustic signal characteristic of mechanical disturbance such as digging in the vicinity of a buried pipe might legitimately precede the detection of a leak due to damage caused by digging. Conversely, an acoustic signal characteristic of rotating machinery operating normally at the location in question could be used to reduce the urgency of an alert issued by the leak detector for that location.

Some examples of how models 60 may be used by the model comparator to detect particular types of events may include:

A. Detection of outwardly moving infrasonic frequency peaks in two directions from a central point, at a velocity consistent with expansion of leaking fluid (for example at between 0.1 and than 10 m/s), where the moving peaks persist but diminish in frequency over increasing time and distance at a rate consistent with such a leak (for example at a factor of between 0.1% and 10% per second for at least 10 seconds). Parameters derived from matching with the model could include the central position of the leak based on a fitted central point, and a magnitude based on the maximum frequency detected in the peaks.

B. As for A, but with a further check that there is no detection of a moving disturbance at the same time, and with a localised detection of an acoustic signature providing refinement of the leak position.

C. Detection of a frequency peak (for example static or moving within a particular frequency range such as 0.1 to 20 Hz or 0.01 to 50 Hz) which persists with a phase change of the same sign for at least ten seconds. This could be indicative, for example, of a change in conformation of a building structure over a similar time scale, for example deformation of a bridge under a static or moving load.

Although specific embodiments of the invention have been described with reference to the drawings, the skilled person will be aware that variations and modifications may be applied to these embodiments without departing from the scope of the invention defined in the claims.

The invention claimed is:

1. A distributed optical fibre sensor for detecting changes in the environment of a sensing optical fibre, the sensor comprising:
   a probe light source arranged to generate probe light pulses;
   an optical detector arranged to receive probe light backscattered within the sensing optical fibre and to detect a coherent Rayleigh backscatter interference signal within the backscattered probe light; and
   an analyser arranged to detect an infrasonic signal in the coherent Rayleigh backscatter interference signal, and to determine changes in the environment of the sensing optical fibre from the infrasonic signal,
   wherein the determined changes in the environment comprise an inferred event, according to an event model, in the environment of the sensing optical fibre, and the analyser is arranged to make a comparison comprising matching one or more aspects of the detected coherent Rayleigh backscatter interference signal to the event model, based on a position of the inferred event relative to the sensing optical fibre, and to detect such an inferred event if the comparison is positive, and
   wherein the analyser is arranged to track the optical phase of the matched coherent Rayleigh backscatter interference signal, and the event model requires the phase of the matched coherent Rayleigh backscatter interference signal to change monotonically in the vicinity of the inferred event.

2. The sensor of claim 1 wherein the optical detector is arranged to detect the coherent Rayleigh backscatter interference signal as a function of both time and of position along the sensing optical fibre.

3. The sensor of claim 2 where the changes in the environment of the sensing fibre give rise to changes in one or more of temperature and strain, and therefore refractive index, of the sensing optical fibre, and thereby give rise to the detected changes in the coherent Rayleigh backscatter interference signal as a function of both time and position along the sensing optical fibre.

4. The sensor of claim 1 wherein the event model requires a characteristic of the matched coherent Rayleigh backscatter interference signal followed over time to reach a peak value wherein the peak value reached diminishes in magnitude with increasing distance from the inferred event.

5. The sensor of claim 1 wherein the event model requires a timing of a peak in a characteristic of the matched coherent Rayleigh backscatter interference signal to become more delayed with increasing distance from the inferred event.

6. The sensor of claim 1 wherein the event model requires a degree of spatial symmetry about a position of the inferred event to be present in a characteristic of the matched coherent Rayleigh backscatter interference signal.

7. The sensor of claim 1 wherein the analyser is arranged to determine a power law behaviour of spatial movement of one or more features of the detected backscatter interference signal, and to infer a geometry of expansion of the event from an exponent of the power law behaviour.

8. The sensor of claim 7 wherein the power law behaviour of spatial movement of one or more features of the detected backscatter interference signal comprises power law behaviour of one or more of position and speed along the sensing optical fibre with respect to time of a peak in a characteristic of the interference signal.

9. The sensor of claim 8 wherein the exponent of power law behaviour of position along the sensing fibre of a peak in a characteristic of the interference signal with respect to time is within a range from about 1 representing linear expansion, through about ½ representing planar expansion, to about ⅓ representing volumetric expansion, of a fluid discharging from a leak into the environment of the sensing optical fibre.

10. The sensor of claim 1 wherein the characteristic of the matched coherent Rayleigh backscatter interference signal comprises at least one of: rate of change of optical phase; frequency; fringe visibility; and fringe intensity.

11. The sensor of claim 1 wherein the analyser is also arranged to detect an acoustic signal in the detected coherent Rayleigh backscatter interference signal, at frequencies above infrasonic frequencies.

12. The sensor of claim 11 wherein the event model comprises an expected acoustic signal of the event, the analyser being arranged to match the detected acoustic signal to the expected acoustic signal in making the comparison.

13. The sensor of claim 12 wherein the expected acoustic signal is an acoustic signal of a fluid escaping from a structure in the vicinity of the sensing optical fibre.

14. The sensor of claim 12 wherein the analyser is arranged to refine the location of the supposed event using the position along the sensing optical fibre of a peak in the expected acoustic signal.

15. The sensor of claim 11 wherein the analyser is also arranged to detect from the acoustic signal a disturbance in the environment of the sensing optical fibre which is moving along the sensing optical fibre, and to selectively reject a detected event if it is coincident with such a disturbance.

16. The sensor of claim 1 wherein the event model is a model of a leak of fluid from a structure proximal to the sensing optical fibre.

17. A method of detecting changes in the environment of a sensing optical fibre, comprising:
- delivering probe light pulses into a sensing optical fibre disposed within the environment;
- detecting a coherent Rayleigh backscatter interference signal from probe light backscattered within the sensing optical fibre; and at least one of:
- (a) detecting an infrasonic signal in the coherent Rayleigh backscatter interference signal and determining changes in the environment of the sensing optical fibre from the infrasonic signal, and (b) determining, from the coherent Rayleigh backscatter interference signal, changes in the environment of the sensing optical fibre, wherein the determined changes in the environment are within an infrasonic frequency range,
- wherein the determined changes in the environment comprise an inferred event, according to an event model, in the environment of the sensing optical fibre, and the method comprises making a comparison comprising matching one or more aspects of the detected coherent Rayleigh backscatter interference signal to the event model, based on a position of the inferred event relative to the sensing optical fibre, and detecting such an interred event if the match is positive; and
- the method further comprising tracking the optical phase of the matched coherent Rayleigh backscatter interference signal, wherein the event model requires the phase of the matched coherent Rayleigh backscatter interference signal to change monotonically in the vicinity of the inferred event.

18. The method of claim 17 wherein the determined changes in the environment of the sensing fibre give rise to changes in one or more of temperature and strain, and therefore refractive index, of the sensing optical fibre, and thereby give rise to the detected changes in the coherent Rayleigh backscatter interference signal as a function of both time and position along the sensing optical fibre.

19. A distributed optical fibre sensor for detecting changes in the environment of a sensing optical fibre, the sensor comprising:
- a probe light source arranged to generate probe light pulses;
- an optical detector arranged to receive probe light backscattered within the sensing optical fibre and to detect a coherent Rayleigh backscatter interference signal within the backscattered probe light; and
- an analyser arranged to determine, from the coherent Rayleigh backscatter interference signal, changes in the environment of the sensing optical fibre, wherein the determined changes in the environment are within an infrasonic frequency range,
- wherein the determined changes in the environment comprise an inferred event, according to an event model, in the environment of the sensing optical fibre, and the analyser is arranged to make a comparison comprising matching one or more aspects of the detected coherent Rayleigh backscatter interference signal to the event model, based on a position of the inferred event relative to the sensing optical fibre, and to detect such an inferred event if the comparison is positive, and
- wherein the analyser is arranged to track the optical phase of the matched coherent Rayleigh backscatter interference signal, and the event model requires the phase of the matched coherent Rayleigh backscatter interference signal to change monotonically in the vicinity of the inferred event.

20. The sensor of claim 19 wherein the event model requires a characteristic of the matched coherent Rayleigh backscatter interference signal followed over time to reach a peak value wherein the peak value reached diminishes in magnitude with increasing distance from the inferred event.

21. The sensor of claim 19 wherein the event model requires a timing of a peak in a characteristic of the matched coherent Rayleigh backscatter interference signal to become more delayed with increasing distance from the inferred event.

22. The sensor of claim 19 wherein the event model requires a degree of spatial symmetry about a position of the inferred event to be present in a characteristic of the matched coherent Rayleigh backscatter interference signal.

23. The sensor of claim 19 wherein the analyser is arranged to determine a power law behaviour of spatial movement of one or more features of the detected backscatter interference signal, and to infer a geometry of expansion of the event from an exponent of the power law behaviour.

24. The sensor of claim 23 wherein the power law behaviour of spatial movement of one or more features of the detected backscatter interference signal comprises power law behaviour of one or more of position and speed along the sensing optical fibre with respect to time of a peak in a characteristic of the interference signal.

25. The sensor of claim 24 wherein the exponent of power law behaviour of position along the sensing fibre of a peak in a characteristic of the interference signal with respect to time is within a range from about 1 representing linear expansion, through about ½ representing planar expansion, to about ⅓ representing volumetric expansion, of a fluid discharging from a leak into the environment of the sensing optical fibre.

26. The sensor of claim 19 wherein the characteristic of the matched coherent Rayleigh backscatter interference signal comprises at least one of: rate of change of optical phase; frequency; fringe visibility; and fringe intensity.

27. The sensor of claim 19 wherein the matched coherent Rayleigh interference signal is within an infrasonic frequency range.

28. The sensor of claim 19 wherein the analyser is also arranged to detect an acoustic signal in the detected coherent Rayleigh backscatter interference signal, at frequencies above infrasonic frequencies.

29. The sensor of claim 28 wherein the event model comprises an expected acoustic signal of the event, the analyser being arranged to match the detected acoustic signal to the expected acoustic signal in making the comparison.

30. The sensor of claim 29 wherein the expected acoustic signal is an acoustic signal of a fluid escaping from a structure in the vicinity of the sensing optical fibre.

31. The sensor of claim 29 wherein the analyser is arranged to refine the location of the supposed event using the position along the sensing optical fibre of a peak in the expected acoustic signal.

32. The sensor of claim 28 wherein the analyser is also arranged to detect from the acoustic signal a disturbance in the environment of the sensing optical fibre which is moving along the sensing optical fibre, and to selectively reject a detected event if it is coincident with such a disturbance.

33. The sensor of claim 19 wherein the event model is a model of a leak of fluid from a structure proximal to the sensing optical fibre.

34. A distributed optical fibre sensor for detecting changes in the environment of a sensing optical fibre, the sensor comprising:

a probe light source arranged to generate probe light pulses;

an optical detector arranged to receive probe light backscattered within the sensing optical fibre and to detect a coherent Rayleigh backscatter interference signal within the backscattered probe light; and an analyser arranged to determine an infrasonic signal in the coherent Rayleigh backscatter interference signal, and to detect changes in the environment of the sensing optical fibre from the infrasonic signal, wherein the determined changes in the environment comprise an inferred event, according to an event model, in the environment of the sensing optical fibre, and the analyser is arranged to make a comparison comprising matching one or more aspects of the detected coherent Rayleigh backscatter interference signal to the event model, based on a position of the inferred event relative to the sensing optical fibre, and to detect such an inferred event if the comparison is positive, and wherein the analyser is arranged to determine a power law behaviour of spatial movement of one or more features of the detected backscatter interference signal, and to infer a geometry of expansion of the event from an exponent of the power law behaviour.

35. The sensor of claim 34 wherein the optical detector is arranged to detect the coherent Rayleigh backscatter interference signal as a function of both time and of position along the sensing optical fibre.

36. The sensor of claim 35 where the changes in the environment of the sensing fibre give rise to changes in one or more of temperature and strain, and therefore refractive index, of the sensing optical fibre, and thereby give rise to the detected changes in the coherent Rayleigh backscatter interference signal as a function of both time and position along the sensing optical fibre.

37. The sensor of claim 34 wherein the power law behaviour of spatial movement of one or more features of the detected backscatter interference signal comprises power law behaviour of one or more of position and speed along the sensing optical fibre with respect to time of a peak in a characteristic of the interference signal.

38. The sensor of claim 37 wherein the exponent of power law behaviour of position along the sensing fibre of a peak in a characteristic of the interference signal with respect to time is within a range from about 1 representing linear expansion, through about ½ representing planar expansion, to about ⅓ representing volumetric expansion, of a fluid discharging from a leak into the environment of the sensing optical fibre.

39. The sensor of claim 34 wherein the characteristic of the matched coherent Rayleigh backscatter interference signal comprises at least one of: rate of change of optical phase; frequency; fringe visibility; and fringe intensity.

40. The sensor of claim 36 wherein the event model is a model of a leak of fluid from a structure proximal to the sensing optical fibre.

41. A method of detecting changes in the environment of a sensing optical fibre, comprising:

delivering probe light pulses into a sensing optical fibre disposed within the environment;

detecting a coherent Rayleigh backscatter interference signal from probe light backscattered within the sensing optical fibre; and at least one of:

(a) detecting an infrasonic signal in the coherent Rayleigh backscatter interference signal and determining changes in the environment of the sensing optical fibre from the infrasonic signal, and (b) determining, from the coherent Rayleigh backscatter interference signal, changes in the environment of the sensing optical fibre, wherein the determined changes in the environment are within an infrasonic frequency range, wherein the determined changes in the environment comprise an inferred event, according to an event model, in the environment of the sensing optical fibre, and the method comprises making a comparison comprising matching one or more aspects of the detected coherent Rayleigh backscatter interference signal to the event model, based on a position of the inferred event relative to the sensing optical fibre, and detecting such an event if the match is positive;

the method further comprising determining a power law behaviour of spatial movement of one or more features of the detected backscatter interference signal, and inferring a geometry of expansion of the event from an exponent of the power law behaviour.

42. The method of claim 41 wherein the determined changes in the environment of the sensing fibre give rise to changes in one or more of temperature and strain, and therefore refractive index, of the sensing optical fibre, and thereby give rise to the detected changes in the coherent Rayleigh backscatter interference signal as a function of both time and position along the sensing optical fibre.

43. The method of claim 41 wherein the power law behaviour of spatial movement of one or more features of the detected backscatter interference signal comprises power law behaviour of one or more of position and speed along the sensing optical fibre with respect to time of a peak in a characteristic of the interference signal.

44. The method of claim 43 wherein the exponent of power law behaviour of position along the sensing fibre of a peak in a characteristic of the interference signal with respect to time is within a range from about 1 representing linear expansion, through about ½ representing planar expansion, to about ⅓ representing volumetric expansion, of a fluid discharging from a leak into the environment of the sensing optical fibre.

45. A distributed optical fibre sensor for detecting changes in the environment of a sensing optical fibre, the sensor comprising:

a probe light source arranged to generate probe light pulses;

an optical detector arranged to receive probe light backscattered within the sensing optical fibre and to detect a coherent Rayleigh backscatter interference signal within the backscattered probe light; and an analyser arranged to determine, from the coherent Rayleigh backscatter interference signal, changes in the environment of the sensing optical fibre, wherein the determined changes in the environment are within an infrasonic frequency range, wherein the determined changes in the environment comprise an inferred event, according to an event model, in the environment of the sensing optical fibre, and the analyser is arranged to make a comparison comprising matching one or more aspects of the detected coherent Rayleigh backscatter interference signal to the event model, based on a position of the inferred event relative to the sensing optical fibre, and to detect such an inferred event if the comparison is positive, and wherein the analyser is arranged to determine a power law behaviour of spatial movement of one or more features of the detected backscatter interference signal, and to infer a geometry of expansion of the event from an exponent of the power law behaviour.

46. The sensor of claim 45 wherein the power law behaviour of spatial movement of one or more features of the detected backscatter interference signal comprises power law behaviour of one or more of position and speed along the sensing optical fibre with respect to time of a peak in a characteristic of the interference signal.

47. The sensor of claim 46 wherein the exponent of power law behaviour of position along the sensing fibre of a peak in a characteristic of the interference signal with respect to time is within a range from about 1 representing linear expansion, through about ½ representing planar expansion, to about ⅓ representing volumetric expansion, of a fluid discharging from a leak into the environment of the sensing optical fibre.

48. The sensor of claim 45 wherein the characteristic of the matched coherent Rayleigh backscatter interference signal comprises at least one of: rate of change of optical phase; frequency; fringe visibility; and fringe intensity.

49. The sensor of claim 45 wherein the matched coherent Rayleigh interference signal is within an infrasonic frequency range.

* * * * *